(12) United States Patent
Chakravarthi et al.

(10) Patent No.: US 7,213,080 B2
(45) Date of Patent: May 1, 2007

(54) INTELLIGENT RADIO DESIGN FOR SATELLITE GATEWAYS AND TERRESTRIAL BASE STATIONS

(75) Inventors: Prakash Chakravarthi, Germantown, MD (US); Anupama Dharap, New Mumbai, IN (US)

(73) Assignee: Comsat Corporation, Clarksburg, MD (US)

(*) Notice: Subject to any disclaimer, the term of this patent is extended or adjusted under 35 U.S.C. 154(b) by 655 days.

(21) Appl. No.: 09/904,860

(22) Filed: Jul. 16, 2001

(65) Prior Publication Data

US 2002/0029293 A1 Mar. 7, 2002

Related U.S. Application Data

(60) Provisional application No. 60/218,216, filed on Jul. 14, 2000.

(51) Int. Cl.
*G06F 15/16* (2006.01)
*H04Q 7/20* (2006.01)

(52) U.S. Cl. .................... 709/249; 455/13.1; 455/12.1; 455/303

(58) Field of Classification Search ................ 370/330, 370/324, 311; 455/13.4, 12.1, 13.1, 303; 725/120; 709/249
See application file for complete search history.

(56) References Cited

U.S. PATENT DOCUMENTS

| | | | |
|---|---|---|---|
| 6,377,561 B1 * | 4/2002 | Black et al. | 370/330 |
| 6,400,925 B1 * | 6/2002 | Tirabassi et al. | 455/12.1 |
| 6,711,140 B1 * | 3/2004 | Agarwal et al. | 370/324 |
| 6,731,613 B1 * | 5/2004 | Provance | 370/311 |
| 6,760,566 B1 * | 7/2004 | Wright et al. | 455/13.4 |
| 2004/0172658 A1 * | 9/2004 | Rakib et al. | 725/120 |

* cited by examiner

*Primary Examiner*—Jungwon Chang
(74) *Attorney, Agent, or Firm*—Sughrue Mion, PLLC

(57) ABSTRACT

An adaptive intelligent radio module (IRM) is provided in an intelligent radio design for gateways between satellite and terrestrial networks. The intelligent radio module monitors channel signal quality at the channel units of the gateway to determine whether the quality of a channel unit is below a predetermined quality threshold. If the channel quality is greater than or equal to the predetermined quality threshold, then a standard channel unit is employed, and nominal algorithms are used to process the channel. However, if the channel quality is below the quality threshold, then a high performance channel unit is used that employs complex algorithms unique to the particular quality defect of the channel quality. Various additional functions can be performed at the receive side and the transmit side of the channel units monitored by the IRM. Further, the IRM can add or enhance existing algorithms in accordance with new technology.

19 Claims, 5 Drawing Sheets

INTELLIGENT RADIO DESIGN FOR SATELLITE GATEWAYS AND TERRESTRIAL BASE STATIONS

This application claims the benefit of U.S. Provisional Application No. 60/218,216, filed Jul. 14, 2000, under 35 U.S.C. §119(e).

BACKGROUND OF THE INVENTION

1. Field of the Invention

The present invention relates to a communication method and system that adapts to channel and/or propagation conditions, and more specifically, an intelligent radio module (IRM) that optimizes performance of channel units in a gateway.

2. Background of the Related Art

FIGS. 1 and 2 illustrate a related art processing system. As illustrated in FIG. 1, the related art processing system includes an antenna and RF processing unit 1 that communicates with a conversion unit 2, which performs analog-to-digital as well as digital-to-analog conversion for transmission and/or reception. A gateway 3 is connected between the conversion unit 2 and a terrestrial network 10.

In the gateway 3, uplinking is performed by a transmission baseband processing unit 6 that receives an input from the terrestrial network 10, and outputs a signal to a modulator 5, which outputs a modulated signal to a transmission intermediate frequency (IF) processing unit 4. The conversion unit 2 then receives the output of the transmission IF processing unit 4.

To perform downlinking, the gateway 3 includes a reception IF processing unit 7 that receives a signal from the conversion unit 2. A demodulator 8 demodulates the output of the reception IF processing unit 7 to a reception baseband processing unit 9, which is connected to the terrestrial network 10.

FIG. 2 illustrates additional details of the related art processing system. A RF antenna 11 receives the RF signal, which is down-converted to an IF in a heterodyne receiver 12. The heterodyne receiver 12 is connected to a synthesizer 13. At the IF stage, the individual subscriber channels are isolated and filtered in accordance with a control 14 and a filter 15. The isolated, filtered signals are then sent through a processing unit 16 to a demodulator 8, which includes an analog-to-digital converter 17. Channel processing units 18a . . . 18n in the gateway 3 receive and process inputs for the channels.

On the receive side, after demodulation, the bit stream is sent to the reception baseband processing unit 9 for further processing before going into the terrestrial network. The reverse operation takes place on the transmit side, as the transmitted signals are filtered, combined and up-converted to the RF frequency for transmission by the antenna 11.

Two related art methods are provided for the channel units 18a . . . 18n to perform signal processing on the related art systems illustrated in FIGS. 1 and 2. In the first related art method, the channel units are developed for the worst case channel conditions, so that receiver performance meets specifications. In the second related art method, the channel units are developed for nominal conditions. The first related art method has a higher cost than the second related art method, as the overall implementation cost of the gateway will be higher if all channel units are developed for worst case channel conditions. Further, the second related art method fails to meet basic performance requirements during the worst case channel conditions.

However, the related art processing systems have various problems and disadvantages. For example, but not by way of limitation, the related art system does not have channel units that have sufficient flexibility to adapt to channel conditions and/or propagation, and use different processing schemes based on channel conditions. Therefore, the related art systems are inflexible in terms of performance, even though implementation and control resides in the software. To guarantee a minimum level of performance, related art systems design the channel units for worst case scenario, which results in an increased cost. If the channels are of sufficient quality, the channel units are either underutilized or perform extra processing.

SUMMARY OF THE INVENTION

It is an object of the present invention to provide a radio system capable of adaptively processing reception and transmission signals carried on a plurality of channels, based on channel conditions.

It is another object of the present invention to improve efficiency of reception and transmission of poor quality signals at a reduced cost.

It is yet another object of the present invention to ensure high-quality end-to-end transmission with complex algorithms for poor quality channels and nominal algorithms for all other channels.

To achieve these and other objects, a system for performing communication between a satellite network and a terrestrial network is provided, comprising a means for receiving and transmitting data between said first network and said second network, said receiving and transmitting means comprising a means for processing a plurality of channels having a corresponding plurality of signal qualities, and a means for controlling said channel units to implement at least one communication algorithm in accordance with said signal qualities.

Additionally, a computer readable data transmission medium is provided, comprising a processor and a memory under control of said processor. The memory of the data transmission medium includes instructions for enabling said processor to perform steps, comprising (a) monitoring signal quality of a channel unit to generate a corresponding signal quality output, (b) determining whether said signal quality output is less than a prescribed threshold, (c) performing a first operation if said signal quality output is less than said prescribed threshold, and performing a second operation if said signal quality is greater than or equal to said prescribed threshold, and (d) performing at least one of transmission and reception.

Further, a method of performing communication between a first network and a second network is provided, comprising the steps of (a) monitoring signal quality of a channel unit to generate a corresponding signal quality output, (b) determining whether said signal quality output is less than a prescribed threshold, (c) performing a first operation if said signal quality output is less than said prescribed threshold, and performing a second operation if said signal quality is greater than or equal to said prescribed threshold, and (d) performing at least one of transmission and reception.

Also, a system for performing communication between a first network and a second network is provided, comprising a gateway coupled to receive and transmit data between said first network and said second network, said gateway comprising a plurality of channel units, and a control module that selects ones of said channel units to implement at least one algorithm in accordance with channel quality.

BRIEF DESCRIPTION OF THE DRAWINGS

The accompanying drawings, which are included to provide a further understanding of preferred embodiments of the present invention and are incorporated in and constitute a part of this specification, illustrate embodiments of the invention and together with the description serve to explain the principles of the drawings.

DETAILED DESCRIPTION OF THE INVENTION

Reference will now be made in detail to the preferred embodiment of the present invention, examples of which are illustrated in the accompanying drawings. In the present invention, the terms are meant to have the definition provided in the specification, and are otherwise not limited by the specification. For example, but not by way of limitation, the term "intelligent" includes the ability of the channel unit design to adapt to channel and/or propagation conditions, or the capability of a system to provide a unique response based on channel conditions and accumulated knowledge.

The present invention includes an intelligent radio design for satellite gateway stations and hubs in mobile satellite systems, and incorporates features that adapt to field conditions encountered by terminals. The present invention deals with high volume applications including, but not limited to, cellular base stations at the macro-cellular, micro-cellular and at the pico-cellular level.

According to the present invention, response of a preferred radio system to incoming carriers on the receive and/or transmit side is divided into (1) a general response (i.e., the same set of algorithms are implemented regardless of the channel conditions), and (2) a unique response (i.e., more computationally intensive or less computationally intensive algorithms are implemented) based on channel conditions. The general response is typically based on a single criterion and includes a simple algorithm that is convenient for implementation, while the unique response adapts and optimizes based on a number of criteria, and usually includes complex, computationally intense algorithms.

The present invention provides for the channel unit implementation in the gateway by selecting a channel unit from a pool of channel units and implementing end-to-end functionality to meet specifications based on selecting an appropriate algorithm from a pool of algorithms. The pool of available channel units comprise both nominal and high performance channel units, and the pool of available algorithms comprise nominal and computationally intensive algorithms.

To perform channel unit implementation in the gateway, the preferred embodiment of the present invention includes an intelligent radio module (IRM), also referred to as a control module, at the gateway. The IRM interfaces with the transmit and receive sides of the channel units to optimize the performance of the channel units and/or reduce cost by selective use of the unique response. More specifically, the pool of channel units and the pool of algorithms achieve the objective of end-to-end radio functionality in transmission and reception, in accordance with the IRM, which can be implemented separately or within the channel unit controllers.

Figure 1:
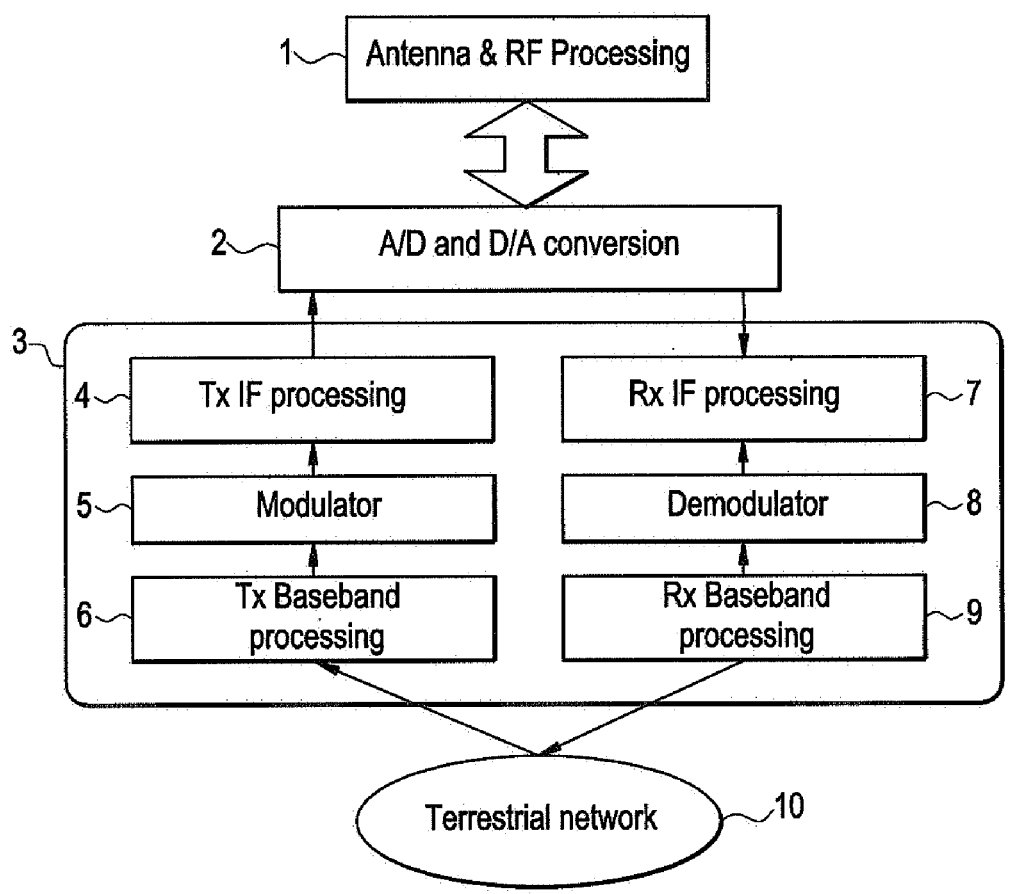
FIG. 1 illustrates a related art processing system for communication between a satellite and terrestrial network.
Figure 2:
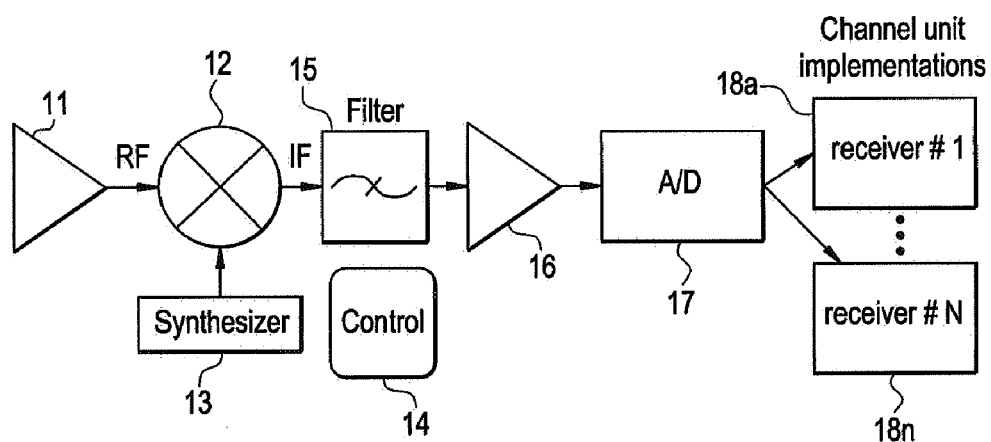
FIG. 2 illustrates a related art processing system for processing the channels of the communication.
Figure 3:
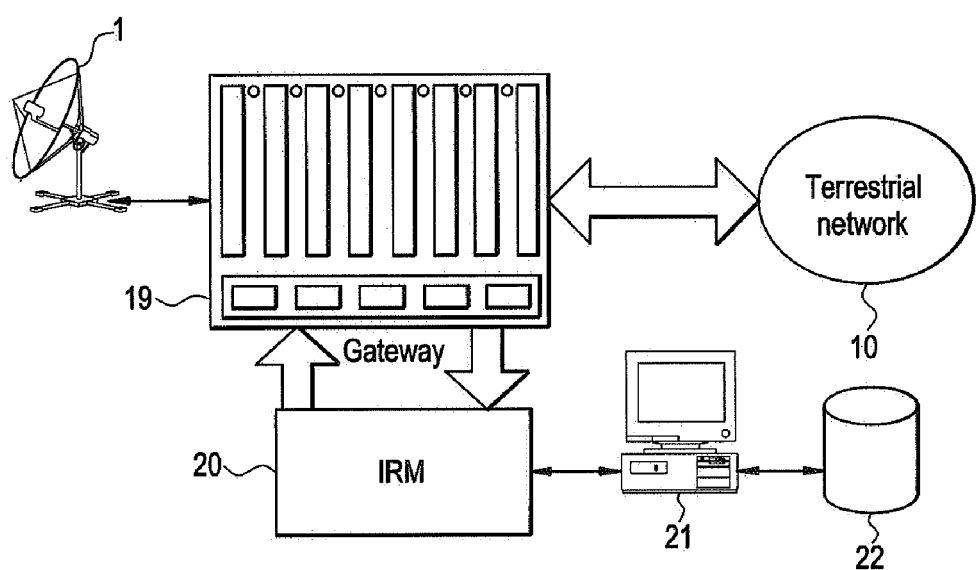
FIG. 3 illustrates an intelligent radio module (IRM) according to the preferred embodiment of the present invention.

FIG. 3 illustrates the intelligent radio system according to the preferred embodiment of the present invention. The antenna 1 and terrestrial network 10 are substantially similar to the related art system illustrated in FIG. 1, and the intelligent radio module (IRM) 20 is positioned at the gateway 19. The IRM 20 interfaces with the transmit and receive sides of the channel units 18a . . . 18n of the gateway 19, as well as a microprocessor (e.g., personal computer) 21 that serves as an operator interface. The microprocessor 21 is coupled to a database 22 that stores statistics and diagnostic information based on traffic transmitted and received by the channel units 18a . . . 18n.

Although the IRM 20 according to the preferred embodiment of the present invention is illustrated as a separate, independent unit in FIG. 3, the IRM 20 is not limited thereto. For example, but not by way of limitation, the IRM 20 may reside in the channel unit controllers 18a . . . 18n in an alternate embodiment of the present invention. Accordingly, the IRM 20 can be implemented as part of controller software and/or interface-of-controller software with the channel units 18a . . . 18n. The addition of the IRM 20 imparts intelligent decision capabilities into the system with a software-driven approach to radio implementation.

The IRM 20 according to the preferred embodiment of the present invention adopts a hybrid approach to the aforementioned related art problem at the receive side of the radio. Because only some of the channels statistically operate near worst case channel conditions at any given time, the channel units that process the individual channels are developed such that a fraction of the channel units employ high performance processing chip/circuit channel units (HPCUs) capable of implementing computationally intensive algorithms. The rest of the channel units (i.e., standard channel units (SCUs)) are used during normal conditions. Then, the IRM 20 monitors individual channels and directs calls to the appropriate channel units (i.e., either HPCU or SPU) based on the signal quality observed in the various channels.

The microprocessor 21 and database interface 22 to the IRM 20 enhance processing capabilities and perform statistical analysis and system diagnostics. More specifically, various actions can be implemented by the microprocessor 21 in the present invention. For example, but not by way of limitation, the microprocessor 21 can store records of traffic and aggregate the records to generate statistics on (a) power vs. time vs. frequency for a specified beam, (b) power vs. time vs. beam number for a specified frequency, and/or (c) power vs. time vs. location for specified frequency and beam, when the satellite system employs multiple beams on the service link.

Additionally, the microprocessor 21 can perform interference estimation as a function of frequency and beam/geographical location of the user terminal and store the information, and develop traffic models and corresponding diurnal variations based on the gateway traffic. The microprocessor 21 and the database 22 can serve as a local resource management center that supports the network control center through exchange of information. Also, the microprocessor 21 can detect and correlate offline bit errors as a function of frequency and beam handovers, and perform other housekeeping functions.

The microprocessor 21 can also download any additional, new, and/or experimental code from a remote site and pass the code to the pool of algorithms for use by the pool of channel units. Thus, it is possible to easily upgrade or enhance the current algorithms, as discussed in greater detail below. The microprocessor 21 also serves as the operator interface with a graphical user interface (GUI) for the operator to perform diagnostics or obtain statistics.

Figure 4:
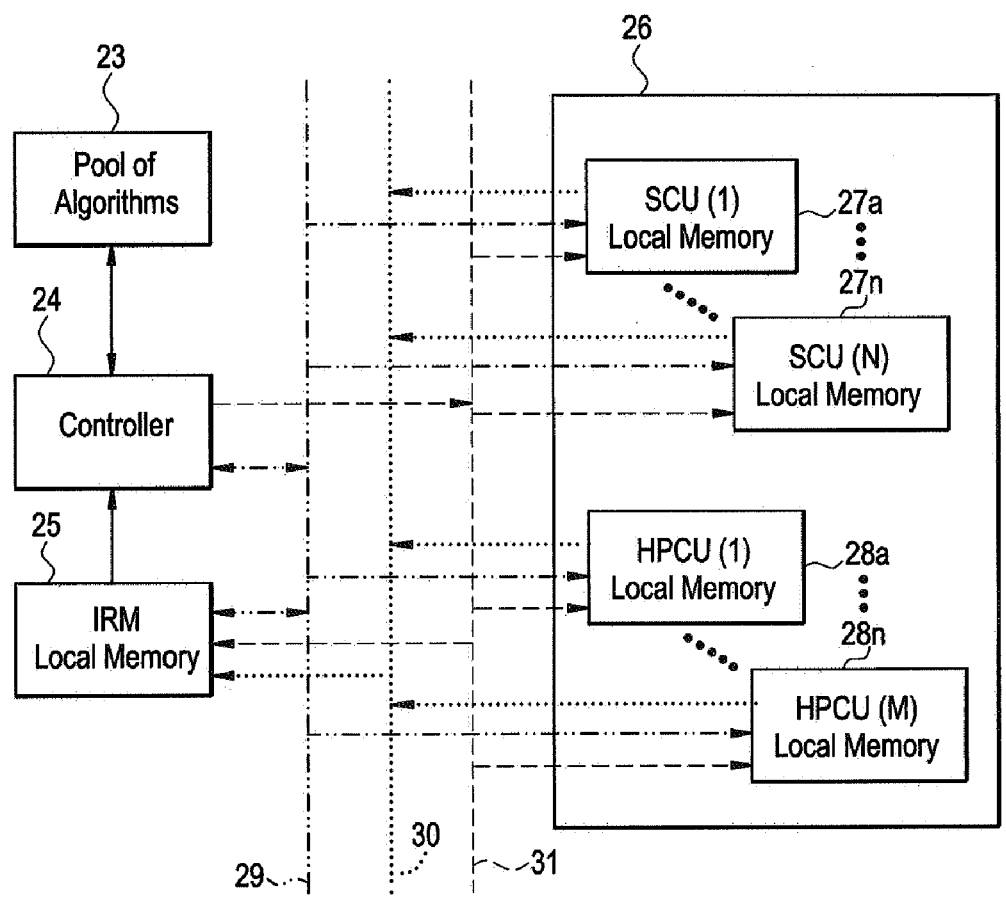
FIG. 4 illustrates a controlling mechanism of the IRM according to the preferred embodiment of the present invention.

FIG. 4 illustrates a control architecture for the IRM 20 and the gateway 19 implementation based on a pool of channel units 26 and an algorithm pool 23 stored in a memory, according to the preferred embodiment of the present invention. The pool of channel units 26 includes the HPCUs 28a ... 28n and the SCUs 27a ... 27n. A controller 24 controls the download 31 of algorithms from the algorithm pool 23 to the channel unit pool 26 based on status information from an IRM local memory 25, which receives information from the status monitor 30, and also may receive a download 31. The IRM local memory 25 and the controller 24 thus perform switching 29 of channels based on status information and available channel-algorithm combinations.

The IRM 20 instructs the HPCU channel units 28a ... 28n to implement additional computationally intensive algorithms as necessary based on channel quality. The IRM 20 makes those decisions for individual channels based on a set of channel specific metrics determined for each channel, and communicates the decisions to the gateway.

Accordingly, HPCUs have a pool of computationally intensive algorithms to choose from, depending on the specific context. The specific context of the present invention could include, but is not limited to, running an interference suppression algorithm for narrow band interference suppression, or implementing a complex adaptive equalizer to overcome the effects of nonlinear distortion. As noted above, the IRM 20 selects from the pool of algorithms 23 for each channel based on the channel conditions and other available information, to be implemented in the receiver so that end-to-end radio functionality meets the performance specifications. Although such an adaptive scheme is primarily used for the HPCUs 28a ... 28n, the implementation is also applicable to the SCUs 27a ... 27n based on the available processing capacity.

Figure 5:
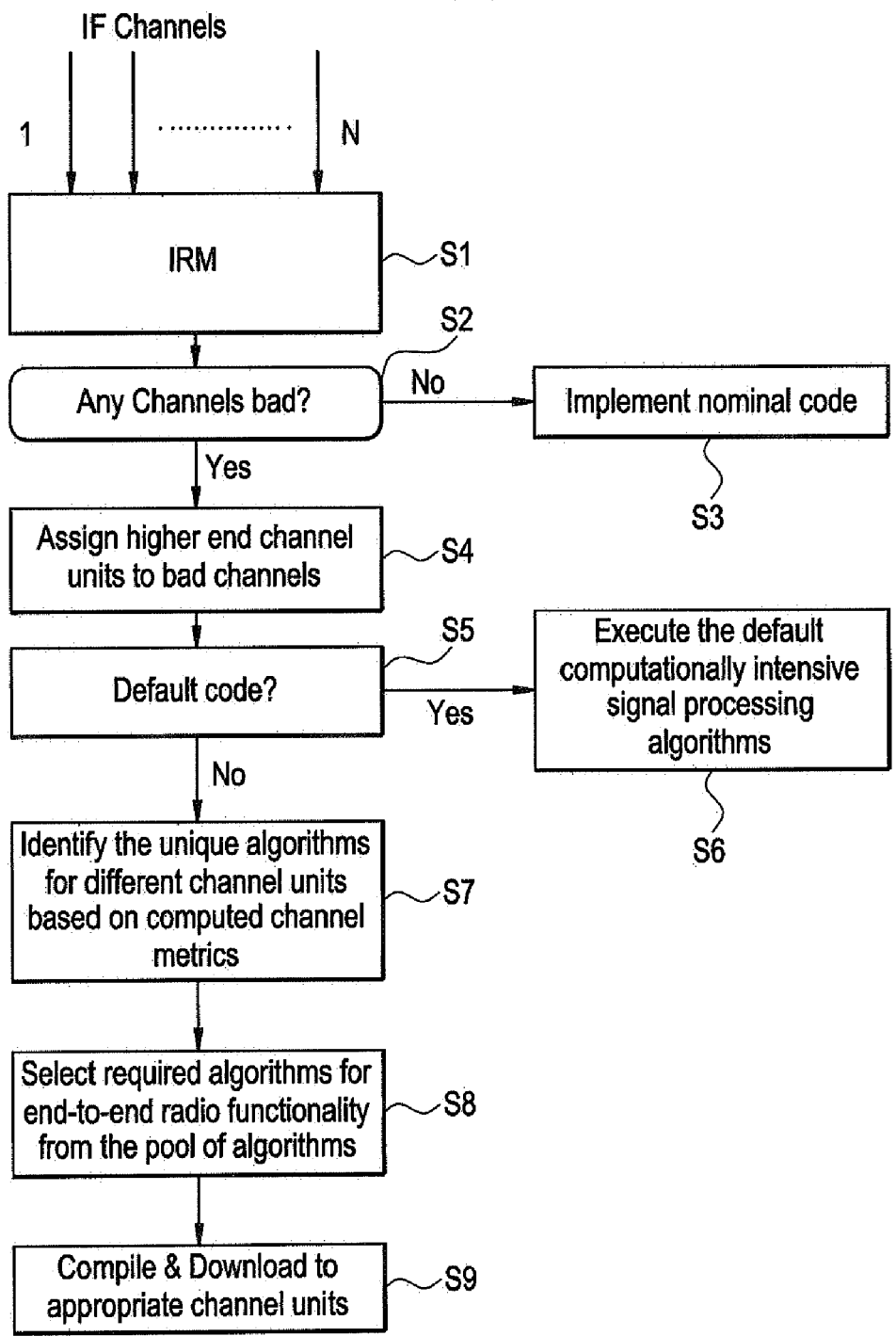
FIG. 5 illustrates a method of signal reception according to the preferred embodiment of the present invention.

FIG. 5 illustrates the flow chart for the interaction between the IRM 20 and the gateway 19 on the receive side according to the preferred embodiment of the present invention. Similar steps occur on the transmit side as well. In step S1, the IRM 20 continuously monitors the channel units 1 ... N on a periodic basis for signal quality. Channel information is passed from the channel units to the controller through an interrupt routine.

The IRM 20 determines a metric for the channel condition to set a quality threshold, and decides on the set of algorithms implemented by the receiver.

In step S2, it is determined whether any of the channels have a signal quality below the prescribed quality threshold (i.e., bad quality channels). If not, the nominal code is implemented in the appropriate channels (e.g., SCU) at step S3. However, if a bad channel is detected, then HPCUs 28a ... 28N are assigned to the bad quality channels at step S4.

After step S4, it is determined whether default code exists in step S5. In step S4, the IRM 20, through its interface with the controllers on the channel units, initiates performance of at least one of the following exemplary algorithms in the HPCUs using the unique response:

1. Interference suppression
2. Adaptive Equalization/Joint space-time equalization
3. Diversity processing (Polarization/frequency)

However, the implementation of algorithms is not limited to the above-noted algorithms.

If default code exists, then in step S6, the default code is executed as computationally intensive signal processing algorithms. However, if no default code exists, then at step S5, unique algorithms are identified by the IRM 20 for the various channel units, based on computed channel metrics, as discussed above. Then, at step S8, the required algorithms are selected from the pool of algorithms 23 to provide end-to-end radio functionality. At step S9, the selected algorithms are compiled and downloaded to the appropriate channel units (e.g., HPCUs 28a ... 28N) for execution of the algorithm(s) by the appropriate channel units.

The channel units selected for a given call based on the signal quality metric can service the entire call, or a portion of the call when the channel conditions are checked again. Alternatively, the gateway 19 may have the channel units 18a ... 18n all available for processing. As noted above, the IRM 20 decides which channel units 18a ... 18n to use.

If the number of bad quality channels exceeds the number of available higher end processing units on the gateway and the IRM 20 is a separate module, the IRM 20 can support one or more of the channel units 18a ... 18n in implementing the computationally complex algorithms by allocating spare processing capacity to the channel units 18a ... 18n. Thus, an additional measure of protection is provided to ensure that the channels maintain the desired quality of service (QOS).

In addition to the above-mentioned processing capabilities of the HPCUs 28a ... 28n, the IRM 20 can also coordinate, via interface with the channel unit controller, the following processing implementations at the HPCU for the receive side of the radio:

1. Advanced time and phase recovery implementations not implemented under normal circumstances;
2. Spectral analysis of the carriers using FET or other techniques for frequency domain analysis;
3. Interference estimation; and
4. Characterizing system performance as the system migrates to the next generation.

On the transmit side, data rate adaptation and coding rate adaptation are performed similarly, based on the measured quality on the receive side. If the IRM 20 measures high interference levels and/or severe fading on the receive side, the IRM 20 adapts the transmit data rate and coding rate based on system level considerations, including, but not limited to, correlation between the fades on the transmit and receive frequencies, and correlation between interference on the transmit and receive frequencies.

The preferred embodiment of the present invention may also include additional features on the transmit side, including, but not limited to, adaptive beam-forming and pre-equalization on the transmit side to correct for channel distortion.

While the transmit side of a related art radio is generally not as complex as the receive side of the radio, particularly for processing, the extra processing capacity of the HPCUs are also used in migration to the next generation systems. For example, but not by way of limitation, as spectrum congestion places stringent requirements on using bandwidth efficiently, future generation mobile systems will likely use higher order modulation or coded modulation schemes. When the HPCUs are free, they can be used to test next generation transmit waveforms in an operational scenario if the receiving mobile terminal demodulates the waveform. Such a testing capability is useful in characterizing the transmit performance of a system migrating towards the next generation.

The higher end channel units also test the performance of the system on the receive side as the system evolves into the next generation system by downloading the appropriate new algorithms. Based on the observed performance, processing is optimized before the next generation is implemented.

Thus, the preferred embodiment of the present invention automatically allows for backward compatibility as the system migrates to future generation systems. As the system evolves, the pool of available algorithms increases, appending the currently available set. Since the IRM 20 can choose from the available set, backward compatibility to previous generation standards and waveforms is available. In an alternative embodiment of the present invention that provides for backwards compatibility, a few channel units that are lower end can be set aside for users who have yet to migrate to the next generation.

The preferred embodiment of the present invention has various advantages. For example, but not by way of limitation, the present invention results in a cost savings in the channel unit implementation while statistically achieving the performance based on the actual channel conditions. The preferred method of the present invention permits the implementation sophisticated algorithms, and permits different software codes to be executed from a pool of algorithms.

Further, an advantage of using the IRM of the present invention for transmit side processing is that adaptation in the channel coding and data rate is performed dynamically, based on channel conditions. During a call, the system may adapt to different transmission rates to maintain QOS. While the aforementioned adaptation takes place without explicit feedback between the transmitter and the receiver, the IRM assumes that the receiving terminal has a software driven structure configured to demodulate based on the incoming data and/or code rate.

Also, for micro-cellular and pico-cellular applications, the present invention has an advantage of a significant cost savings, at least because in pico-cellular environments, thousands of base stations are developed, each of which may process between about 8 to 10 calls at any given time. Statistically, if half the calls use the higher end processing units, the aggregated cost saving is quite large over many thousand base station implementations. While the volume of gateway implementations is not as large for satellite applications, the cost saving is still significant due to a substantially larger number of channels processed by each gateway.

Another advantage is that the HPCUs can employ fairly sophisticated signal processing algorithms that cannot be conventionally employed in channel unit implementations, including, but not limited to, interference suppression, adaptive equalization and diversity processing. The techniques of the present invention provide a significant gain in the bit error rate (BER) or in enhancing the quality of service (QOS). Further, the higher end processing units can implement the nominal algorithm processing based on code downloaded from the controller to the processors on the SCUs, which minimizes power consumption.

Also, the preferred method of the present invention based on the IRM of the present invention has the advantage of being useful for migration to new technologies. As the cost of DSPs and other processors fall, more powerful and sophisticated algorithms can be implemented by the IRM for the same cost. By employing the HPCUs, performance can be stretched as close to the physical limit as possible with enhanced computational capability.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A system for providing a communication interface between a satellite network and a terrestrial network, comprising:
   a gateway coupled to receive and transmit data between said satellite network and said terrestrial network, said gateway comprising a plurality of channel units; and
   a control module, comprising means for monitoring signal quality of at least one of transmitted data and received data, operative to determine whether said signal quality is less than a predetermined standard and to select at least one of said channel units to implement at least one algorithm in accordance with channel quality;
   further comprising: a microprocessor coupled to the control module that stores traffic information and performs statistical analysis and diagnostic activity in accordance with said traffic information; and a data storage device coupled to the microprocessor and configured to serve as a local resource manager that supports a network control center through exchange of said traffic information;
   wherein said statistical analysis generates statistics on at least one of (a) power vs. time for a specified beam, (b) power vs. time vs. beam number for a specified frequency and (c) power vs. time vs. location for a specified frequency and a specified beam, wherein said satellite network comprises multiple beams on a service link.

2. The system of claim 1, wherein said microprocessor also performs interference estimation as a function of beam/geographical location of a use terminal to generate traffic models and corresponding diurnal variations in accordance with traffic on said system.

3. The system of claim 1 wherein said microprocessor detects and correlates offline bit errors as a function of frequency and beam handovers, and transmits a code from a remote site to said control module as additions to said at least one algorithm, so as to alter said at least one algorithm.

4. The system of claim 1, wherein said microprocessor is an operator interface with a graphical user interface and permits said user to perform said diagnostic activity.

5. The system of claim 1, wherein said control module is positioned one of external to said gateway and in said channel units of said gateway.

6. The system of claim 1, wherein said plurality of channel units comprises: at least one high performance channel unit (HPCU) configured to implement a unique response; and at least one standard channel unit (SCU) configured to implement a nominal algorithm, wherein said control module selects said at least one SCU when channel quality is greater than or equal to a prescribed threshold, and said control module selects said at least one HPCU when said channel quality is below a prescribed threshold.

7. The system of claim 6, wherein said unique response comprises said at least one algorithm selected from a plurality of computationally complex algorithms and in accordance with said channel quality, said computationally complex algorithms comprising at least one of interference suppression for narrow band suppression, a complex adaptive equalization to overcome nonlinear distortion and diversity processing for maintaining at least one of proper polarization and frequency.

8. The system of claim 1, wherein said control module receives code that alters or replaces said at least one algorithm.

9. The system of claim 1, wherein at a receive side of said system, said at least one algorithm comprises at least one of: advanced time and phase recovery implementations that are not implemented when said channel quality is greater than or equal to a prescribed threshold; spectral analysis of carriers by frequency domain analysis; interference estimation; and characterization of system performance as said system migrates to a next generation, prior to implementation of said next generation.

10. The system of claim 1, wherein at a transmit side of said system, said at least one algorithm comprises at least one of adaptive beam-forming and pre-equalization to correct for channel distortion.

11. The system of claim 1, wherein said control module comprises: a pool of algorithms that stores said at least one algorithm; a local memory device that stores status information for said channel units; and a controller that selects said at least one algorithm from said pool of algorithms and transmits said at least one algorithm to said selected channel units, in accordance with said status information received from said local memory device.

12. A method of providing a communication interface between a satellite network and a terrestrial network, comprising the steps of:
   (a) at least one of receiving and transmitting data between said satellite network and said terrestrial network via a plurality of channel units;
   (b) monitoring signal quality of at least one channel unit to generate a corresponding signal quality output;
   (c) determining whether said signal quality output is less than a prescribed threshold; and
   (d) performing a first operation if said signal quality output is less than said prescribed threshold, and performing a second operation if said signal quality is greater than or equal to said prescribed threshold;
   further comprising: storing communication traffic information and performing statistical analysis and diagnostic activity in accordance with said traffic information; and using a data storage device configured to serve as a local resource manager to support a network control center through exchange of said information, wherein said statistical analysis generates statistics on at least one of (a) power vs. time for a specified beam, (b) power vs. time vs. beam number for a specified frequency and (c) power vs. time vs. location for a specified frequency and a specified beam, and wherein said satellite network comprises multiple beams on a service link.

13. The method of claim 12, wherein said first operation comprises implementing an unique code in a high performance channel unit (HPCU) and said second operation comprises implementing a nominal code in a standard channel unit (SCU).

14. The method of claim 13, wherein said implementing said unique code in said HPCU comprises: (a) assigning said HPCU to a channel having said signal quality below said prescribed threshold; and (b) executing one of default computationally intensive signal processing algorithms and identifying an unique algorithm for said channel unit based on corresponding predetermined channel metrics, wherein end-to-end functionality is accomplished in accordance with said unique algorithm identified by a control module.

15. The method of claim 14, wherein said unique algorithm comprises one of: interference suppression for narrow band suppression; a complex adaptive equalization to overcome nonlinear distortion; diversity processing for maintaining at least one of proper polarization and frequency.

16. The method of claim 14, wherein during reception, said unique algorithm performs one of: implementing advanced time and phase recovery that is not implemented when channel quality is greater than or equal to a prescribed threshold; analyzing spectra of carriers by frequency domain analysis; estimating interference; and characterizing system performance as said system migrates to a next generation, prior to implementation of said next generation to ensure backwards compatibility.

17. The method of claim 12, further comprising one of altering and replacing said at least one algorithm with a next generation algorithm for an upgrade, received by a control module.

18. The method of claim 12, further comprising at least one of: performing interference estimation as a function of beam/geographical location of a use terminal to generate traffic models and corresponding diurnal variations in accordance with said traffic information; and detecting and correlating offline bit errors as a function of frequency and beam handovers, and transmits code from a remote site to a control module as additions, so as to alter said algorithm.

19. The method of claim 12, wherein a user performs said diagnostic activity.

* * * * *